No. 852,266.

PATENTED APR. 30, 1907.

E. DE W. R. GARDEN.
ARTIFICIAL TOOTH.
APPLICATION FILED JUNE 11, 1906.

Witnesses
Chas. J. Griesbauer
L. O. Hilton

Inventor
E. Dewitt R. Garden
by H. B. Willson & Co.
Attorneys

UNITED STATES PATENT OFFICE.

ERNEST DE WITT R. GARDEN, OF TARRYTOWN, NEW YORK.

ARTIFICIAL TOOTH.

No. 852,266.      Specification of Letters Patent.      Patented April 30, 1907.

Application filed June 11, 1906. Serial No. 321,224.

*To all whom it may concern:*

Be it known that I, ERNEST DE WITT R. GARDEN, a citizen of the United States, residing at Tarrytown, in the county of Westchester and State of New York, have invented certain new and useful Improvements in Artificial Teeth; and I do declare the following to be a full, clear, and exact description of the invention, such as will enable others skilled in the art to which it appertains to make and use the same.

My invention relates to improvements in artificial teeth, and more particularly to porcelain facings and metal backings for bridgework and crowns.

One object of the invention is to so construct artificial teeth that the strain is removed from the porcelain facing and the connection between the latter and its metal backing.

Another object of the invention is to improve and simplify the construction of artificial dentures of this character, and thereby render the same stronger, more durable, and less expensive.

With the above and other objects in view, my invention consists of certain novel features of construction, combination and arrangement of devices hereinafter described and claimed.

Figure 1:
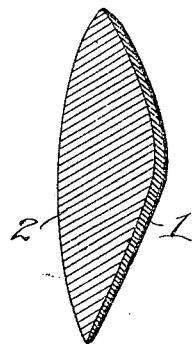
Figure 2:
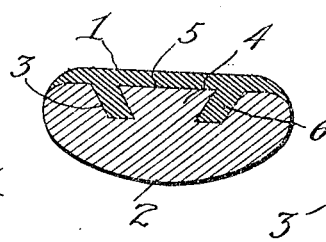
Figure 3:
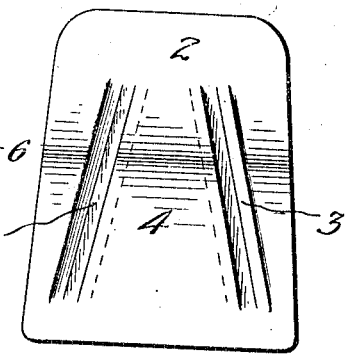

In the accompanying drawings,—Figure 1 is a vertical sectional view through one of my improved artificial teeth adapted for use in the lower jaw; Fig. 2 is a transverse or horizontal sectional view through the same; Fig. 3 is a rear view of the porcelain facing of a tooth; and Figs. 4, 5 and 6 are views similar to Figs. 1, 2 and 3, showing a slightly modified form of the invention embodied in a tooth adapted for use in the upper jaw.

In the embodiment of my invention herein shown, I construct the metal backing 1 and the porcelain facing 2 of the tooth so that they may be connected without the use of small pins, which so readily break, and so that the strain is removed from the porcelain facing and the connection between it and the metal backing. The faces are molded with their backs made convex throughout their length and by this curve, strain on the facing is greatly lessened and the occluding edge bears no strain.

In the form shown in the first three figures of the drawing the rear face of the porcelain facings 2 are made of convex shape longitudinally and have formed therein upwardly and inwardly converging grooves 3, which provide between them a tapered portion 4, which is of dovetail shape in cross-section, owing to the angular disposition of the grooves or channels 3. The portion or tongue 4 is adapted to enter a cavity or seat 5, formed in the metal backing 1, by providing the latter with converging, angularly-disposed ribs 6, which latter are adapted to enter the grooves 3.

Figure 4:
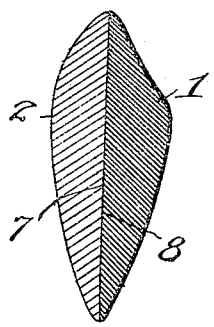
Figure 5:
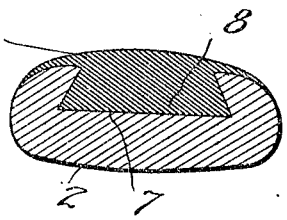
Figure 6:
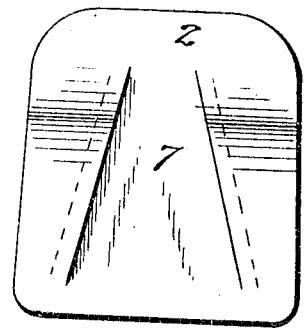

The above object is accomplished as shown in Figs. 4, 5, and 6, of the drawings, by forming in the rear face of the porcelain facing convex longitudinally and with a tapered dovetail groove or channel 7, which is adapted to receive a similar-shaped projection or enlargement 8 upon the metal backing. The backings and facings are cemented together, and owing to their peculiar shapes cause the strain on the edge of the porcelain facing to be thrown upon the metal portion of the tooth and its connections.

It will be noted that in the form of the tooth which is shown in Figs. 1, 2 and 3, and which is for use on the lower jaw, the tapered, dovetailed portion 4 has its broadest end uppermost or nearest the outer biting edge of the tooth, while in the form of tooth which is shown in the last three figures of the drawing, and which is for use upon the upper jaw, has its tapered, dovetailed portion 8 arranged so that its broadest end is lowermost or adjacent to the lower cutting edge of the tooth.

The metal backings are made to fit the porcelain facings, preferably by pressing or burnishing metal, such as gold or platina, upon the inner face of the facing, then removing this metal, painting its surface which was in contact with the facing, and flowing solder upon its opposite side or face to stiffen it. The backing is then replaced upon the facing and fitted to the model, as in bridge-work; then wax the backing with a stiff wax and carefully remove the facing. Invest the backings as in bridge-work; then solder all backings to their proper anchorages. Remove the investment and cement the facings to their respective places. The construction, use, and advantages of these facings and backings will be readily understood. They can be used for both lower and upper teeth and are easily applied by the operator. There will be no delay in removing the investment from the cast, and no waiting for it to cool. The facing will be strong, with little or no metal showing, and will have a firm back. There will be no checking and the color will always remain the same.

Various changes in the form, proportion, and the minor details of construction may be resorted to without departing from the principle or sacrificing any of the advantages of this invention, as defined by the appended claims.

Having thus described my invention, what I claim as new, and desire to secure by Letters Patent, is,—

An artificial tooth comprising a facing having a longitudinally-convex inner face provided with spaced, inwardly-extending undercut grooves diverging toward the cutting edge thereof, and a metal backing having spaced ribs diverging to conform to the grooves in the face and adapted to fit therein, whereby the strain on the edge of the facing is thrown upon the metal backing and its connections.

In testimony whereof I have hereunto set my hand in presence of two subscribing witnesses.

ERNEST DE WITT R. GARDEN.

Witnesses:
FRANK D. BRIGGS,
CLARA R. GARDEN.